(No Model.)
M. W. DEWEY.
APPARATUS FOR FORMING OR SHAPING SHEET METAL ELECTRICALLY.
No. 438,407. Patented Oct. 14, 1890.
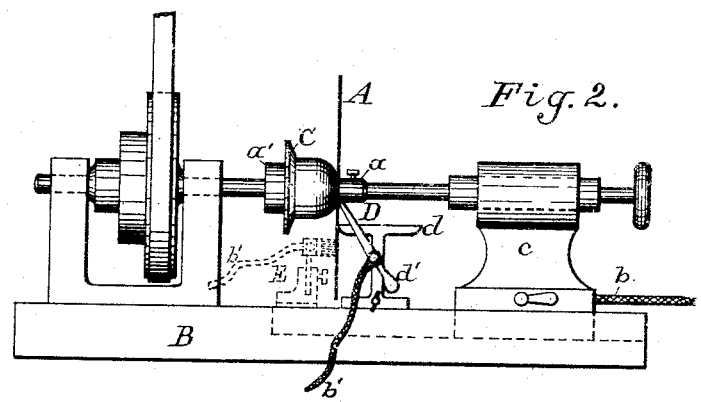
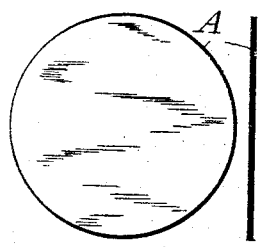
Fig. 1.
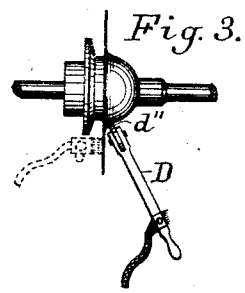
Fig. 3.
Fig. 4.
Fig. 5.
Fig. 6.
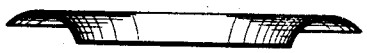
Fig. 7.
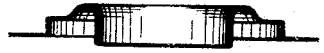
Fig. 8.
WITNESSES:
C. L. Bindixon
H. M. Seaman
INVENTOR,
Mark W. Dewey,
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

APPARATUS FOR FORMING OR SHAPING SHEET METAL ELECTRICALLY.

SPECIFICATION forming part of Letters Patent No. 438,407, dated October 14, 1890.

Application filed July 28, 1890. Serial No. 360,122. (No model.)

*To all whom it may concern:*

Be it known that I, MARK W. DEWEY, of Syracuse, in the county of Onondaga, in the State of New York, have invented new and useful Improvements in Apparatus for Forming or Shaping Sheet Metal Electrically, (Case No. 67,) of which the following, taken in connection with the accompanying drawings, is a full, clear, and exact description.

My invention relates to certain apparatus for use in my process or method of forming sheet-metal articles which requires the employment of heat to soften or anneal the metal, and the application of pressure to gradually conform the sheet to the surface of a suitable die or mold.

Articles have been manufactured from sheet metal heretofore by successive and graduated pressing, depending on the depth of the article, and in some cases the metal was annealed after each pressing, as such pressing operation rapidly hardened it, which in turn caused the metal to tear and crack. Some metals, as German silver, are too brittle to be pressed to a great extent by this method. The process depends for its success upon the malleability of the metal; and it is the purpose of my invention to keep the metal annealed or in a softened condition during a greater part of if not the entire or complete formation of the article and to decrease the number of molds as well as the number of pressings usually required in forming or shaping the article, and also to save time and handling.

The object of my present invention is to provide apparatus or means for accomplishing my process or method which will produce more durable and superior sheet-metal ware, allow the formation of articles from thicker sheet metal and from various metals heretofore incapable of being pressed.

My invention consists in certain apparatus and devices hereinafter more particularly described and claimed, and useful in practicing the method set forth and claimed in another application for patent filed by me May 17, 1890, Serial No. 352,159; and it consists, essentially, in the combination, with a die or mold, of means for holding and rotating said die or mold with the sheet of metal to be operated upon, connections to pass an electric current through the sheet while it is rotated, and means for imparting pressure to the sheet to conform the same to the surface of said die or mold.

My invention consists, also, in certain other combination of apparatus hereinafter described, and specifically set forth in the claims.

In the accompanying drawings, Figure 1 is a side and edge view of a disk of sheet metal to be operated upon. Fig. 2 shows a side elevation of a lathe for holding the disk of sheet metal upon a mold and rotating the same while pressure is applied with an instrument to form said disk to the shape of the mold. Fig. 3 shows a sheet-metal article partly formed over the same mold. Fig. 4 represents the article completed. Figs. 5, 6, 7, and 8 are sectional views of a number of different-shaped articles that may be formed by my apparatus.

Referring specifically to the drawings, A in Fig. 2 is a sheet of thin metal, preferably in the form of a disk, as shown in Fig. 1, mounted upon a lathe B and held by pressure from a head-stock $a$ against a mold C of the required form, fixed on the face-plate $a'$ of the revolving spindle. The metal sheet may be cut into the form of a disk in any suitable manner either before or after said sheet is placed in position upon the mold in the lathe. The disk is preferably heated by passing a heating current of electricity through the same from a point at or near its center, or where the head-stock $a$ bears against it, to the point where the pressure instrument or burnisher D is in contact with it. The pressure-instrument D may be of metal or some suitable non-conducting material. When said instrument is metallic, the current may be circulated through the apparatus, as shown, from the conductor $b$ through the back head $c$, spindle, and head-stock $a$ to the sheet A, through said sheet to the point where the instrument D is pressed against it, and through the instrument to and through the flexible conductor $b'$, connected therewith, back to a suitable source of electricity, to which both conductors $b$ and $b'$ are connected.

When the instrument D is of non-conducting material, as bone or wood, or even when metallic, the current may be passed through an adjustable contact or brush E, bearing upon the disk, as shown in dotted lines in the figure. Said contact may be adjusted and moved to any desired position to make and maintain contact with the disk while it is rotated and formed into an article. The conductor $b$ is then connected to the contact E, instead of the instrument D. Instead of passing the current through the lathe-spindle, another contact attached to the conductor $b$ may be provided to bear upon the disk. The pressure-instrument D is held upon the lathe-rest $d$ as a fulcrum, and while the disk A and mold C are revolved said instrument is applied to the disk near the center, which is rapidly bent or swaged, so as to fit close against the curved face of the mold. The instrument D may be held and moved by any suitable means, but preferably in the hand and by the handle $d'$. A gentle pressure is caused to bear on one point, thus producing a slight depression; but as the sheet is spinning at high velocity the depression at once forms a circle, and so by continuing the pressure of the instrument and gradually moving the same the sheet is molded into any form accordingly.

The mold C is preferably made of non-conducting material or of conducting material coated with a non-electric conducting material, as a mineral paint or enamel.

Various forms of pressure instruments or burnishers may be used, the one shown in Fig. 3 being provided with a roll $d''$ to decrease the friction between the bearing-points.

Sectional molds are employed when the form of the article, as shown in Fig. 6, will not permit the removal of a solid mold after the article is formed or spun over the mold. It will be also apparent that the sheet of metal may be by this method maintained in a heated, softened, or annealed condition during the entire formation of the article, if desired, and that with suitable current-regulating devices in circuit the sheet may be kept at any temperature desired without danger of burning or heating the sheet metal too much.

Having described my invention, what I claim as new, and desire to secure by Letters Patent, is—

1. In an electric apparatus for forming sheet-metal articles, the combination, with a die or mold, of means for holding and rotating said die or mold with the sheet of metal to be operated upon, connections to pass an electric current through the sheet while it is rotated, and means for imparting pressure to the sheet to conform the same to the surface of said die or mold.

2. In an electric apparatus for forming sheet-metal articles, the combination, with a suitable die or mold, of means for holding and rotating said die or mold with the sheet of metal to be operated upon, a pressure-instrument to gradually conform the sheet to the form of the surface of the said mold, and terminals of an electric circuit in contact with the sheet, one at its center or axis and the other at a point nearer the edge or periphery of the sheet.

3. In an electric apparatus for forming sheet-metal articles, the combination, with a suitable die or mold, of means for holding and rotating said die or mold with the sheet of metal to be operated upon, a pressure-instrument to gradually conform the sheet to the form of the surface of the said mold, and terminals of an electric circuit connected to the sheet, one terminal constituting the headstock of the rotating means and the other terminal the pressure-instrument.

4. In an electric apparatus for forming sheet-metal articles, the combination, with a suitable die or mold, of means for holding and rotating said die or mold with the sheet of metal to be operated upon, a pressure-instrument having a revolving bearing to gradually conform the sheet to the form of the surface of the said mold, and terminals of an electric circuit in contact with the sheet.

5. In an electric apparatus for forming sheet-metal articles, the combination, with a suitable die or mold, of means for holding and rotating said die or mold with the sheet of metal to be operated upon, a universally-movable pressure-instrument to gradually conform the sheet to the form of the surface of the said mold, and terminals of an electric circuit in contact with the sheet.

6. In an apparatus for electrically forming sheet-metal articles, the combination of a die or mold, means for holding the sheet against said die or mold, and a movable pressure-instrument to conform the sheet to the shape of the surface of the mold, and electric terminals in contact with the sheet.

7. In an apparatus for electrically forming sheet-metal articles, the combination of a die or mold, means for holding the sheet against said die or mold, and a movable pressure-instrument to conform the sheet to the shape of the surface of the mold, and electric connections leading to said means for holding the sheet against the mold and to the movable pressure-instrument.

In testimony whereof I have hereunto signed my name this 26th day of July, 1890.

MARK W. DEWEY. [L. S.]

Witnesses:
C. H. DUELL,
H. M. SEAMANS.